Feb. 5, 1946.　　B. N. ASHTON ET AL　　2,393,962
FLUID ACTUATED LOCK CYLINDER
Filed March 9, 1943
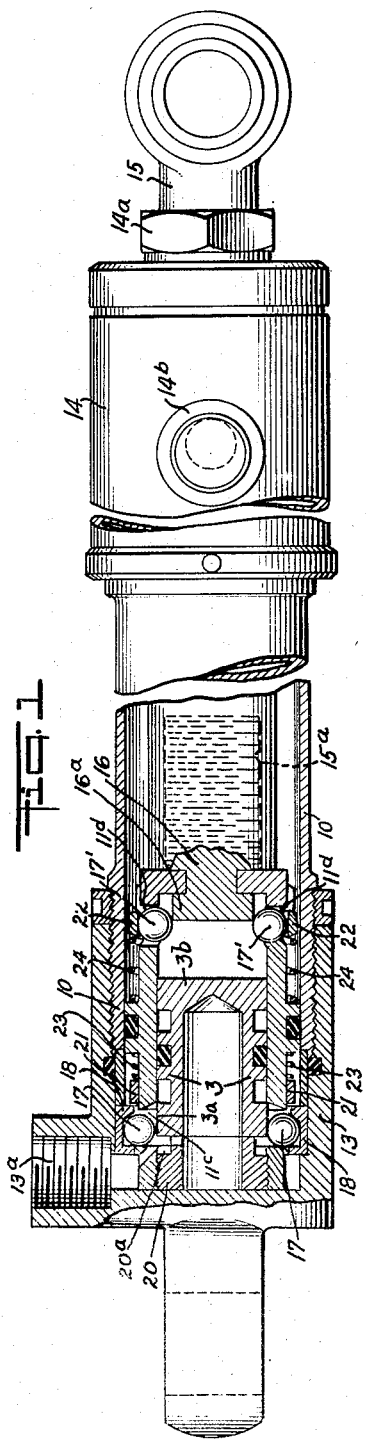

Patented Feb. 5, 1946

2,393,962

UNITED STATES PATENT OFFICE 2,393,962

FLUID ACTUATED LOCK CYLINDER

Benjamin N. Ashton, Kingston, and Nelson G. Kling, Great Neck, N. Y., assignors to Electrical Incorporated, New York, N. Y., a corporation of Delaware Application March 9, 1943, Serial No. 478,574

3 Claims. (Cl. 121—40)

The present invention pertains to hydraulic or pneumatic jacks. Its object is to provide a locking device for mechanically locking the piston of such a jack in its extreme positions of movement so that upon completion of its stroke in one direction, it cannot be displaced; for instance, by the action of an external force, unless fluid pressure is admitted into the cylinder to produce a stroke in the opposite direction.

To that end the piston head and the cylinder ends are provided with corresponding recessed portions adapted to form, when in register with each other, two or more peripheral compartments. In the locked position, balls are received in said compartments so that one portion of each ball is held in the piston head and another in the cylinder end. The presence of these balls prevents any axial displacement of the piston head with respect to said cylinder. In the unlocked position, i. e., when said piston head travels along said cylinder, said balls are lodged in suitable recesses provided either in the former or in the latter.

In addition, said piston head slidably carries an auxiliary element capable of relatively small axial displacements with respect to the same. Said auxiliary element is subjected to the same fluid pressure as the piston and, consequently, whenever fluid pressure is admitted into the cylinder said element will tend to travel in the same direction as the piston head. When, upon the completion of a stroke, the piston head reaches one of its extreme positions in the cylinder, said auxiliary element will also be in one of the extreme positions which it can assume with respect to said piston head. In that position said auxiliary element will, by virtue of the structure of its axial end faces, displace said balls from the aforesaid recesses—in which they were lodged during the stroke of the piston head—push the same into said compartments and lock them therein. When fluid pressure is admitted for the return stroke of the piston said auxiliary element will be displaced first—since the piston head is locked—and this will set the balls free. The forces exerted on said balls by the piston head when the same is subjected to fluid pressure will push said balls back into said recesses as soon as they are set free, whereby the piston head is unlocked and capable to travel along the cylinder.

Further features may be gathered from the following description of two embodiments of the present invention given by way of example and illustrated in the accompanying drawing.

Fig. 1 is a longitudinal view partly in section of a jack according to the present invention, showing the piston in its locked position;

Fig. 2 is an enlarged section of a detail of Fig. 1, showing the position of the locking elements at the beginning of a stroke of the piston; and Fig. 3 is a partial section, showing the piston in its locked position in one cylinder end of a modified jack.

The embodiment of the invention illustrated in Figures 1 and 2 includes a cylinder 10 and a hollow tubular piston 11 which is provided with a pair of circumferential spaced apart flanges 11a and 11b. A piston ring 12 is disposed between the flanges 11a and 11b for sealing the piston 11 to the cylinder 10. The opposite ends of the cylinder 10 are threaded to receive internally threaded caps 13 and 14.

The cap 14 is provided with a gland 14a through which passes a piston rod 15 that has its inner end connected to the piston 11. The piston rod 15 and the piston 11 may be connected by a threaded plug 16 that is secured in the end of the piston and is received in an internally threaded recess 15a in the end of the piston rod 15.

The cap 13 is provided with a coupling 13a through which liquid under pressure can be supplied to the interior of the cylinder 10 to force the piston 11 to the right, as viewed in Figure 1. The cap 14 is also provided with a coupling 14b through which fluid may be admitted to force the piston 11 to the left.

As best shown in Figure 2, the piston 11 is provided with a plurality of radially extending openings or apertures 11c in its side walls for receiving one or more balls 17 that cooperate with the piston 11 and the cylinder 10 to lock these elements together at the end of the piston stroke. The apertures 11c receive the balls 17 loosely so that the balls can move outwardly freely into engagement with a channel member 18 that is secured to the inside of the cap 13 in axially fixed relationship. The channel member 18 is provided with an internal recess 18a having an inclined wall 18b at the inner edge thereof. The recess 18a and the apertures 11c form a compartment for receiving the balls 17 so that they may engage in the recess 18a and the aperture 11c simultaneously to lock the piston 11 to the cylinder 10. The inclination of the wall 18b is such as to normally force the balls 17 inwardly upon endwise movement of the piston 11.

A cup-shaped auxiliary piston 19 is slidably mounted in the interior of the piston 11 and is provided with suitable sealing rings 19a to prevent leakage past the piston 19. The diameter of the piston 19 is such that when it is at its extreme limit of movement, it will engage the balls 17 and force them into the recess 18a.

In order to retain the balls in position to be engaged by the piston 19, the left-hand end of the piston 11 is threaded to receive an annular plug 20 having a reduced annular portion 20a that projects into the piston 11 sufficiently to retain the balls 17 in the apertures 11c, while permitting them to be retracted completely within the periphery of the piston 11. The plug 20 also serves as a limit stop for movement of the piston 19 to the left.

The opposite end of the piston 11 may be provided with a similar series of apertures 11d for receiving the balls 17' which cooperate with another channel member (not shown) supported by the cap 14. The balls 17' are retained in the apertures 11d by means of the enlarged head 16a on the threaded stud 16. The balls 17' can be be forced out of the apertures 11d by the action of the piston 19 in traveling to the right-hand end of its stroke.

In order to reduce friction, facilitate movement of the piston 11 and reduce wear on the balls 17 and 17' and the cylinder 10, the piston is provided with retaining means which hold the balls 17 and 17' within the periphery of the piston 11 until the piston 11 reaches substantially the end of its stroke. The retaining means may suitably consist of a pair of rings 21 and 22 disposed on opposite sides of the flanges 11a and 11b. The springs 23 and 24 are interposed between the flanges 11a and 11b and the rings 21 and 22 and normally urge the rings into positions overlying the apertures 11c and 11d. When the piston 11 moves toward the position shown in Figures 1 and 2, the ring 21 will engage the inner edge of the channel member 18 and the spring 23 will be compressed as the piston 11 moves to a position wherein the recesses 11c are aligned with the recesses 18a of the channel member 18, thus uncovering the apertures 11c and permitting the balls to move into the recess 18a. The ring 22 is displaced similarly upon movement of the piston to the right.

In operation, when fluid under pressure is supplied to the coupling 13a, the fluid will act on both the pistons 11 and 19, urging them toward the right. The piston 11 is locked in position, however, by the balls 17, as illustrated in Figures 1 and 2, and cannot move. The piston 19 is free to move, however, and is displaced to the right within the piston 11, thereby freeing the balls 17 and permitting them to move into the piston 11 upon movement of the piston 11 relatively to the inclined edge 18b in the channel member 18. As the piston 11 moves to the right, the retaining member 21 moves into position covering the apertures 11c, retaining the balls 17 in the piston as the piston travels to the right. As the piston 11 approaches the end of its stroke to the right, the piston 19 urges the balls 17' at the right-hand end of the piston 11 outwardly, but cannot do so because of the action of the retaining ring 22. When the ring 22 engages its corresponding channel member, it is stopped while the piston 11 continues to the right, uncovering the apertures 11d therein and permitting the balls 17' to be forced into the channel member by the action of the piston 19, thereby locking the piston in position. This condition remains until fluid under pressure is supplied at the coupling 14b whereafter the reverse of the operation described above takes place.

If desired, the retaining rings 21 and 22 and the springs 23 and 24 can be omitted in order to simplify the construction, but it is preferred to include them in view of the advantages described above.

Figure 3 of the drawing illustrates a modified form of cylinder lock. In this device, the cylinder 30 is provided with a threaded end portion 30a for receiving an internally threaded cap 31. The cap 31 is retained in sealing engagement with the cylinder 30 by means of a threaded ring 32 and a sealing ring 33. The cap 31 is provided with a coupling 34 which communicates with the interior of the cylinder 30 through an aperture 34a. In this form of the invention, one or more locking balls 35 are supported by the cylinder 30 and the cap 31, while the piston 36 is movable relatively thereto. As illustrated, the cap 34 is provided with a cup-shaped member 37 secured to the end of the cap in any suitable way, such as by the set screw 38. The member 37 is provided with one or more apertures 37a which taper in diameter from slightly larger than the diameter of the balls 35 at their outer periphery to slightly less than the diameter of the balls 35 at the inner periphery so that the balls cannot fall into the cylinder. The side walls of the member 37 are spaced from the cylinder 30 a sufficient distance that the balls 35 can be retracted fully, but cannot escape from between the member 37 and the cylinder 30.

The piston 36 may suitably consist of a cylindrical core member 39 having a centrally disposed flange 39a and oppositely threaded reduced end portions 39b and 39c. The center portion of the member 39 is adapted to receive a pair of annulular members 40 and 41. The member 41 includes a disc-like portion 41a which is sealed to the core member 39 by means of a sealing ring 42 and is provided with an axially projecting flange 41b that engages the interior wall of the cylinder 30. The member 41 also includes an oppositely directed flange member 41c engaging the body of the core member 39 and being provided with a plurality of bores 41d for receiving the coil springs 43. The flange member 41c is of less diameter than the interior of the cylinder 30 so that suitable packing 44 of compressible nature can be positioned therein. The leading edge of the flange 41b is beveled so that it can enter the space between the cylinder 30 and the member 37 and urge the balls 35 radially inwardly. The inward movement of the balls 35 locks the piston 36 to the cylinder by forcing the balls in behind a flange 45 on a member 46 that is threaded on the reduced portion 39b. The flange 45 has an inclined inner and outer surface, the inner surface joining with a surface on the member 46 of reduced diameter providing a recess for reception of the balls 41b.

The opposite end of the piston 36 is connected to the piston rod 47 by means of the threaded reduced portion 39c. The member 40 is supported on the member 39 in a manner similar to the member 41 and is normally urged against the piston rod 47 by means of the springs 43.

With the piston 36 in the position shown in Figure 3, the supply of fluid under pressure to the coupling 34 will urge the member 41 to the right, compressing the springs 43. Movement of the member 41 relatively to the piston 36 frees the balls 35 for outward movement by means of the inclined surface of the flange 45, thereby freeing the entire piston 36 for movement to the right.

Upon return movement of the piston 36 to the position shown in Figure 3, the flange 45 will strike the balls 35 first and displace them outwardly. In this position, the balls 35 obstruct the movement of the member 41 so that it is stopped until the flange 45 passes beneath the balls 35. When the flange 45 has passed the balls 35, the springs 43 urge the member 41 to the left and force the balls 35 radially inward behind the flange 45 to lock the piston 36 in position.

It will be understood that the constructions described above are susceptible to considerable modification. For example, the ball-receiving apertures may be substantially the same shape as the balls, that is, circular, or they may be annular or arcuate in order to permit the use of a plurality of balls so that relative rotation of the piston and the cylinder may be obtained. Likewise, the dimensions and shape of the various elements may be modified as the purpose demands.

The foregoing description is not intended to limit the present invention which extends to all changes, modifications and equivalents comprehended within the scope of the appended claims.

What is claimed is:

1. A piston lock for fluid actuated jacks comprising a cylinder having an internal recess adjacent one end thereof, a hollow piston slidable in said cylinder having at least one opening through a side wall adjacent one end thereof, said opening and recess being aligned when the piston is at one end of its stroke, a locking member in said opening movable partially into said recess when said recess and opening are in alignment, a second piston within and slidable axially of the first-mentioned piston in response to fluid pressure thereon for engaging said locking member and forcing it partially into said recess, means slidable on the exterior of the first-mentioned piston and biased to a position for retaining said locking member within said opening, and means in said cylinder for displacing said slidable means at the said one end of the stroke to permit said locking member to enter said recess.

2. Piston lock for hydraulic and pneumatic jacks which comprises a cylinder, a piston slidable therein, a plurality of perforations traversing the wall of the head of said piston, a plurality of corresponding sockets formed in at least one end of said cylinder, said perforations and said sockets being adapted to register with each other so as to form a plurality of compartments when said piston is in one of its extreme postions with respect to said cylinder, a plurality of balls adapted to fit said compartments, auxiliary cavities inside said piston head adjacent said first mentioned cavities in the same and adapted to accommodate said balls completely within said piston head, an auxiliary element associated with said piston head and capable of limited axial displacements with respect thereto, means to subject said auxiliary element to the fluid pressure prevailing in said cylinder, said balls being completely accommodated within said piston head while the same travels within said cylinder, said auxiliary element being adapted to penetrate into said auxiliary cavities and to make contact with said balls when said piston approaches the end of its stroke, to push said balls into said compartments when said first mentioned cavities register with each other and, in its extreme position with respect to said piston head to close said compartments, means to force said balls to enter said auxiliary cavities when said auxiliary element and said piston are displaced from their said extreme positions under the action of fluid pressure admitted into said cylinder, and means to prevent said balls from falling out of said cavities in said piston head while the same is travelling.

3. Piston lock for hydraulic and pneumatic jacks which comprises a cylinder, a piston slidable therein, a plurality of perforations traversing the wall of the head of said piston, a plurality of corresponding sockets formed in at least one end of said cylinder, said perforations and said sockets being adapted to register with each other so as to form a plurality of compartments when said piston is in one of its extreme positions with respect to said cylinder, a plurality of balls adapted to fit said compartments, auxiliary cavities inside said piston head adjacent said first mentioned cavities in the same and adapted to accommodate said balls completely within said piston head, an auxiliary element slidable in the hollow interior of said piston head, means to subject said auxiliary element to the fluid pressure prevailing in said cylinder, said balls being completely accommodated within said piston head while the same travels within said cylinder, said auxiliary element being adapted to penetrate into said auxiliary cavities and to make contact with said balls when said piston approaches the end of its stroke, to push said balls into said compartments when said first mentioned cavities register with each other and, in its extreme position with respect to said piston head, to close said compartments, the portion of said sockets opposite to the adjacent end of said cylinder having a shallow concave curvature and the corresponding portion of said perforations in said piston head being inclined toward the inside thereof so that the pressure exerted on said balls by said piston head in the direction of the distant end of said cylinder tends to force said balls into said auxiliary cavities, an annular sleeve slidably engaging the outer surface of said piston head adapted to cover said perforations, a stop member on the outer surface of said piston head between said perforations and the adjacent end of said piston head, and a spring urging said sleeve against said stop member, said sockets being adapted to engage said sleeve when said piston approaches the end of its stroke and to push the same towards the central portion of said piston head.

BENJAMIN N. ASHTON.
NELSON G. KLING.